United States Patent
Deslande et al.

(10) Patent No.: US 7,536,765 B2
(45) Date of Patent: May 26, 2009

(54) METHOD OF FASTENING A CROSS-MEMBER TO AN ARM AND A SEMI-RIGID AXLE MADE BY THE METHOD

(75) Inventors: Raymond Deslande, Loisy sur Marne (FR); Lydie Even, Neuilly sur Seine (FR); Regis Panozzo, Vitry le François (FR)

(73) Assignee: Vallourec Composants Automobiles Vitry, Vitry le Francois (FR)

( * ) Notice: Subject to any disclaimer, the term of this patent is extended or adjusted under 35 U.S.C. 154(b) by 709 days.

(21) Appl. No.: 10/469,709

(22) PCT Filed: Mar. 12, 2002

(86) PCT No.: PCT/FR02/00878

§ 371 (c)(1),
(2), (4) Date: Nov. 5, 2003

(87) PCT Pub. No.: WO02/074565

PCT Pub. Date: Sep. 26, 2002

(65) Prior Publication Data

US 2004/0148751 A1 Aug. 5, 2004

(30) Foreign Application Priority Data

Mar. 15, 2001 (FR) .................................. 01 03550

(51) Int. Cl.
*B23P 17/00* (2006.01)
*B60B 35/00* (2006.01)
(52) U.S. Cl. ..................... 29/419.2; 29/897.2; 29/517; 219/603; 72/56; 301/124.1; 301/127; 180/905; 280/137.5

(58) Field of Classification Search ................ 29/419.2, 29/897.2, 517, 520; 219/603, 611, 617; 228/107; 72/56; 301/124.1, 127; 180/905; 280/137.5
See application file for complete search history.

(56) References Cited

U.S. PATENT DOCUMENTS 3,005,259 A * 10/1961 Benya et al. .................. 29/505

(Continued)

FOREIGN PATENT DOCUMENTS

FR 2766422 1/1999

(Continued)

OTHER PUBLICATIONS

Article by J.P. Collaudin et G. Faller in the periodical *Métaux Déformation* No. 68 (Sep.-Oct. 1981).

(Continued)

*Primary Examiner*—Essama Omgba
(74) *Attorney, Agent, or Firm*—Greenblum & Bernstein, P.L.C.

(57) ABSTRACT

Process for fabricating an axle that includes a cross-member and arms which are assembled to extremities of the cross-member, wherein the process includes forming a cross-member, forming at least one arm, arranging the cross-member and the at least one arm in a fastening position, and fastening together in a rigid manner the cross-member and the at least one arm using a magneto-forming process. Wherein the fastening occurs while the cross-member and the at least one arm are in the fastening position and at least one of the cross-member and the at least one arm include at least one metallic material. This abstract is not intended to define the invention disclosed in the specification, nor intended to limit the scope of the invention in any way.

14 Claims, 3 Drawing Sheets

U.S. PATENT DOCUMENTS

| | | | |
|---|---|---|---|
| 4,118,134 A * | 10/1978 | Mansel | 403/282 |
| 4,915,534 A * | 4/1990 | Richards | 403/189 |
| 5,324,073 A * | 6/1994 | Alatalo et al. | 280/124.116 |
| 5,554,244 A * | 9/1996 | Ruggles et al. | 156/196 |
| 5,800,024 A | 9/1998 | Steimmel et al. | |
| 5,966,813 A | 10/1999 | Durand | |
| 5,981,921 A | 11/1999 | Yablochnikov | |
| 6,059,378 A * | 5/2000 | Dougherty et al. | 301/124.1 |
| 6,099,084 A | 8/2000 | Bungarten et al. | |
| 6,237,450 B1 * | 5/2001 | Cosenza | 81/436 |
| 6,379,254 B1 | 4/2002 | Yablochnikov | |
| 6,389,697 B1 * | 5/2002 | Benoit et al. | 29/897.2 |
| 6,474,534 B2 * | 11/2002 | Gabbianelli et al. | 228/131 |
| 6,523,841 B2 * | 2/2003 | Glaser et al. | 280/124.106 |
| 6,531,688 B2 * | 3/2003 | Yablochnikov | 219/603 |
| 6,533,300 B1 * | 3/2003 | Hicks et al. | 280/124.106 |
| 6,561,722 B1 * | 5/2003 | Dudko et al. | 403/282 |
| 6,572,199 B1 * | 6/2003 | Creek et al. | 301/124.1 |
| 6,703,594 B2 * | 3/2004 | Yablochnikov | 219/603 |
| 6,813,818 B2 * | 11/2004 | Schmidt | 29/419.2 |
| 6,817,511 B2 * | 11/2004 | Durand | 228/115 |
| 6,860,013 B1 * | 3/2005 | Durand | 29/897.2 |
| 6,891,137 B2 * | 5/2005 | Yablochnikov | 219/603 |
| 6,892,929 B2 * | 5/2005 | Yablochnikov | 228/115 |
| 6,908,023 B2 * | 6/2005 | Yablochnikov | 228/115 |
| 6,908,024 B2 * | 6/2005 | Martin et al. | 228/115 |
| 6,910,617 B2 * | 6/2005 | Yablochnikov | 228/115 |
| 6,921,013 B1 * | 7/2005 | Kichline et al. | 228/115 |
| 7,015,435 B2 * | 3/2006 | Yablochnikov | 219/603 |
| 7,025,245 B2 * | 4/2006 | Gust | 228/107 |

FOREIGN PATENT DOCUMENTS

| | | |
|---|---|---|
| JP | 4-033477 | 2/1992 |
| JP | 7-116751 | 5/1995 |
| JP | 9-166111 | 6/1997 |
| JP | 10-061425 | 3/1998 |

OTHER PUBLICATIONS

English Language Abstract of JP 9-166111.
English Language Abstract of JP 4-033477.
English Language Abstract of JP 7-116751.
English Language Abstract of JP 10-061425.

* cited by examiner

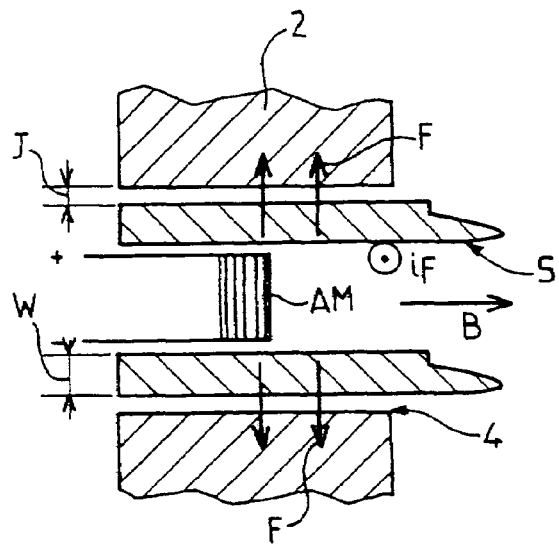 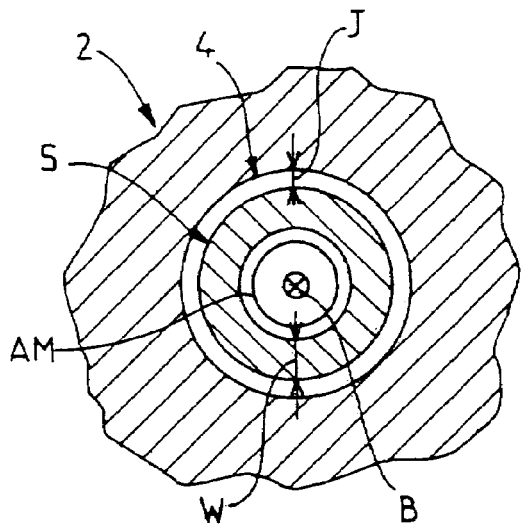
FIG.3A  FIG.3B
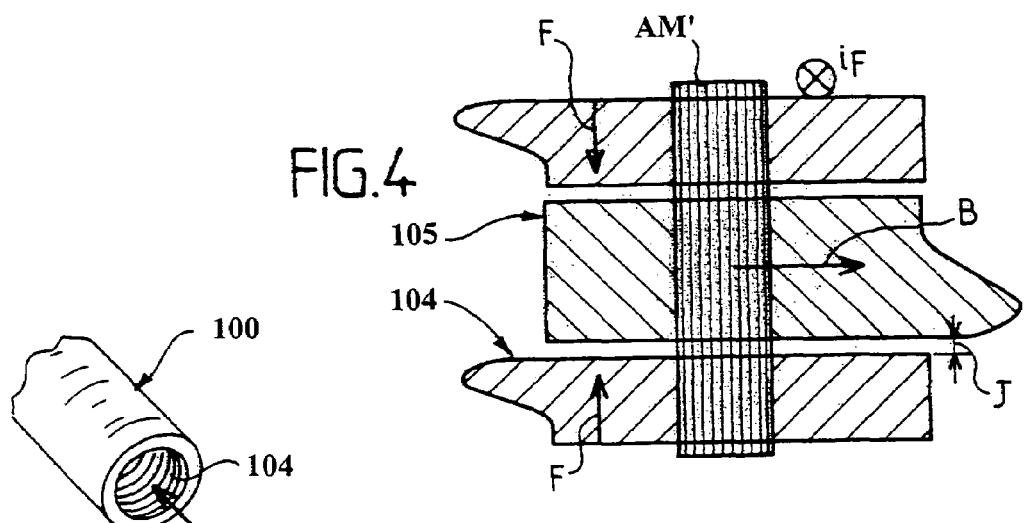
FIG.4
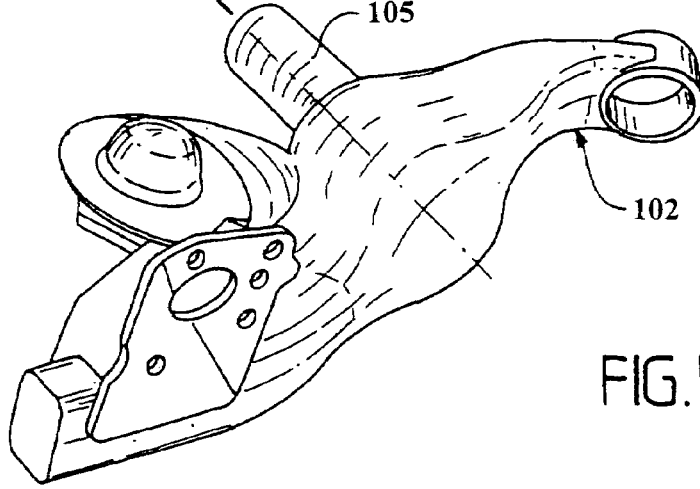
FIG.5

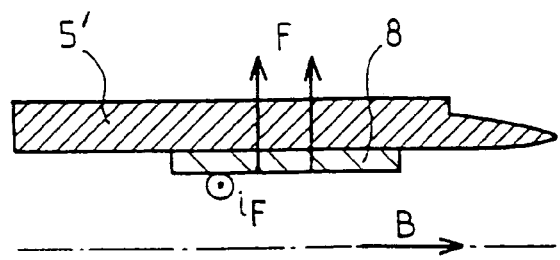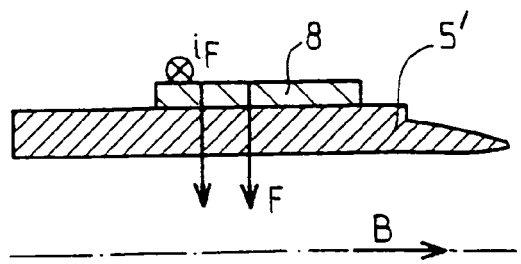
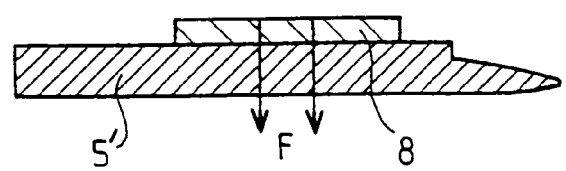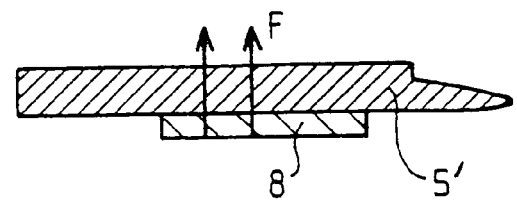
FIG. 6A  FIG. 6B
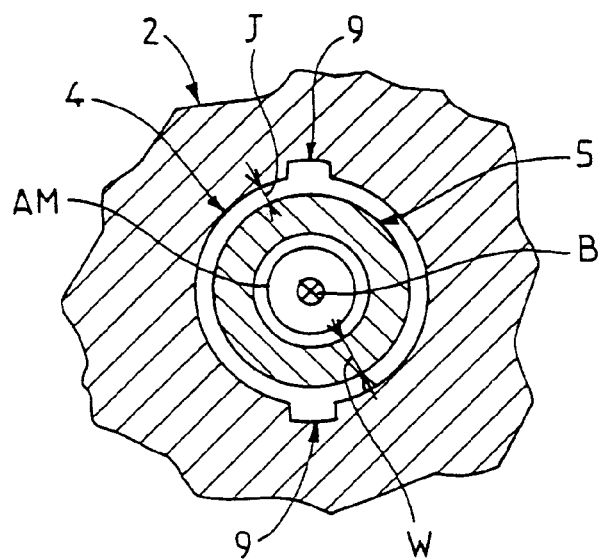
FIG. 7

METHOD OF FASTENING A CROSS-MEMBER TO AN ARM AND A SEMI-RIGID AXLE MADE BY THE METHOD

CROSS-REFERENCE TO RELATED APPLICATIONS

The present application is a National Stage Application of International Application No. PCT/FR02/00878, filed Mar. 12, 2002. Further, the present application claims priority under 35 U.S.C. § 119 of French Patent Application No. 01/03550 filed on Mar. 15, 2001.

BACKGROUND OF THE INVENTION

1. Field of the Invention

The invention concerns the fastening of arms to the cross-member of an axle, in particular in semi-rigid axles for motor vehicles.

2. Discussion of Background Information

An axle of this type comprises two longitudinal arms, each intended to be connected, on the one hand, to a wheel of the vehicle and, on the other hand, to the body shell. These arms are each fastened to the extremity of a cross-member which extends over the width of the vehicle and which is relatively rigid in flexion and supple in torsion. This fastening is usually effected by bolting or by welding (often through the agency of an insert when the arm is made of material that is not very weldable), after adjusting the respective positions of the arms and of the cross-member with the greatest possible precision.

Such axles are generally renowned for being lightweight, economical and quick to assemble.

Nevertheless, the aforementioned fastenings, which are known, increase the weight of said axles and complicate the process of their fabrication, whereas complying with the conditions of endurance and maintaining the relative positions of the arms and of the cross-member, even after fastening, remain imperative.

The present invention aims to improve this situation.

SUMMARY OF THE INVENTION

To this end, the invention proposes a process for fabricating axles, in particular semi-rigid axles provided with a cross-member and with arms assembled at the extremities of the cross-member. The process comprises the following steps:

a) preparing respective preforms for the cross-member and for at least one arm;

b) adjusting the relative positions of these preforms, and c) fastening the preforms together rigidly.

According to a first significant characteristic of the invention, in step a) the preforms are prepared by using, for at least one part of the preforms, at least one metallic material.

According to a second significant characteristic of the invention, step c) comprises a fastening by magneto-forming, permitting the process to be continued, after step c), without correcting the relative positions of the cross-member and of the arm, while observing precisely the positions defined in step b).

In a preferred embodiment, the arm preform and the cross-member preform are fastened to one another by introduction of a protuberance into a homologous socket, followed by a deformation of the protuberance or of its socket by magneto-forming.

The protuberance and/or the socket may have a form generated by rotation or a form not generated by rotation (devoid of rotational symmetry).

The extremity of the cross-member preform is preferably deformed radially in step c).

According to a first embodiment mode, the arm preform comprises a socket into which, in step b), an extremity of the cross-member preform is introduced, and, in step c), the external surface of the extremity of the cross-member preform comes into interfering contact with the internal surface of the socket. According to this first embodiment mode, the protuberance is constituted by the extremity of the cross-member.

The extremity of the cross-member preform is preferably hollow, and, in step c), an electromagnetic element capable of generating a magnetic field is introduced into the cross-member, in order appreciably to "swell" (or distend radially) the extremity of the cross-member preform in its socket by magneto-forming.

In a second embodiment mode, in step c) the socket is tubular, and outside the socket at least one electromagnetic element is disposed which is capable of generating a magnetic field appreciably around the socket, in order to restrict said socket appreciably by magneto-forming.

According to this second embodiment mode, the arm preform comprises a teat forming a protuberance which has been introduced at least partially, during step b), into a homologous tubular socket which is provided at one extremity of the cross-member preform, and, in step c), the external surface of the teat and the internal surface of its socket come into interfering contact with one another.

The expression "interfering contact" is to be understood to mean a contact with interpenetration of the respective surfaces, thus forming a weld.

The arm preform and cross-member preform are advantageously prepared in step a) so that at least one of the elements constituted by the protuberances and/or the socket possesses a form that is not generated by rotation.

Preferably only the element that is part of the arm preform possesses a form that is not generated by rotation, for example a polygonal, elliptical, multi-lobe, circular fluted, notched or grooved form.

Advantageously, in step b), a clearance is left between the protuberance and its socket, permitting the relative positions of the respective arm and cross-member preforms to be adjusted prior to step c).

The clearance that is left is preferably close to 0.5 mm over the radii of the protuberance and of the socket.

The material that is deformed by magneto-forming is chosen so as to possess a ductility that is sufficient for the deformation speeds being considered.

Advantageously, step a) provides for a preparation of the preforms by matching the socket or the protuberance with walls of thicknesses that are chosen so as to be deformed sufficiently during step c) while withstanding the stresses foreseen for an axle in operation.

In the foregoing, the term "preform" (of an arm or a cross-member) designates the blank part that is intended to be deformed by magneto-forming. In the following, this distinction is deliberately omitted, out of concern for simplification.

According to another advantageous characteristic, the arm and the cross-member (and, more particularly, their contact zones) are intended to be produced from different materials.

In very advantageous manner, at least one of the materials of the cross-member and of the arm is not very weldable or not weldable at all.

In advantageous manner, step b) comprises definitive settings of parameters for adaptation of the shape of the axle, such as the definition of a clamp angle of a wheel that is intended to be mounted on the axle, and/or of a camber angle.

The invention also provides for a process for fabricating an axle that includes a cross-member and arms which are assembled to extremities of the cross-member, said process comprising forming a cross-member, forming at least one arm, at least one of the cross-member and the at least one arm comprising at least one metallic material, arranging the cross-member and the at least one arm in a fastening position, and fastening together in a rigid manner the cross-member and the at least one arm using a magneto-forming process, wherein the fastening occurs while the cross-member and the at least one arm are in the fastening position.

The axle may comprise a semi-rigid axle. The fastening may comprise fastening together in a rigid manner an extremity of the cross-member and the at least one arm together using a magneto-forming process. The arranging may comprise inserting the extremity of the cross-member within an opening of the at least one arm. The fastening may comprise subjecting the extremity of the cross-member to radial deformation using the magneto-forming process. The fastening may comprise subjecting the opening of the at least one arm to radial deformation using the magneto-forming process. The arranging may comprise inserting an extremity of the cross-member within an opening of the at least one arm.

The fastening may comprise subjecting the extremity of the cross-member to radial deformation using the magneto-forming process. The fastening may comprise subjecting the opening of the at least one arm to radial deformation using the magneto-forming process. The arranging may comprise inserting a protuberance of the cross-member within a socket of the at least one arm. The fastening may comprise subjecting the protuberance of the cross-member to radial deformation using the magneto-forming process. The fastening may comprise subjecting the socket of the at least one arm to radial deformation using the magneto-forming process.

The arranging may comprise inserting an extremity of the cross-member within an opening of the at least one arm such that an interference fit is provided between the extremity and the opening. The arranging may comprise inserting an extremity of the cross-member within an opening of the at least one arm and wherein the fastening comprises subjecting the extremity of the cross-member to radial deformation using the magneto-forming process. The extremity of the cross-member may comprise a hollow space adapted to receive an electromagnetic element that is capable of generating a magnetic field. The cross-member may comprise an extremity having a hollow space adapted to receive an electromagnetic element that is capable of generating a magnetic field and wherein the fastening comprises subjecting the extremity to outward radial deformation using the magneto-forming process.

The arranging may comprise inserting at least part of a projecting portion of the at least one arm within an extremity of the cross-member and wherein the fastening comprises subjecting the extremity of the cross-member to radial deformation using the magneto-forming process. The extremity of the cross-member may comprise a hollow space adapted to receive the projecting portion. The fastening may comprise subjecting the extremity to inward radial deformation using the magneto-forming process. The hollow space may be defined by a cylindrical wall and wherein the projecting portion comprises an external cylindrical surface. The projecting portion may comprise a teat. The hollow space may comprise a homologous socket. The arranging may comprise providing an interference fit between the hollow space and the projecting portion. The projecting portion may be non-cylindrical. The hollow space may be non-cylindrical.

The arranging may comprise providing a clearance between the hollow space and the projecting portion. The arranging may comprise inserting an extremity of the cross-member within an opening of the at least one arm such that a clearance is provided between the extremity and the opening, whereby the clearance allows for relative positioning of the extremity and the opening.

The process may further comprise adjusting a relative position of the extremity and the opening prior to the fastening. The clearance may be close to 0.5 mm.

The process may further comprise adjusting a relative position of the cross-member and the at least one arm prior to the fastening.

The process may further comprise shaping an extremity of the cross-member prior to the arranging and the fastening.

The process may further comprise shaping an opening of the at least one arm prior to the arranging and the fastening. The process may further comprising shaping an extremity of the cross-member prior to the arranging and the fastening.

The process may further comprise forming an extremity of the cross-member with a wall thickness prior to the arranging and the fastening. The wall thickness may be adapted to deform sufficiently during the fastening and is adapted to withstanding stresses experienced by the axle in operation. The thickness may be approximately equal to or less than 5 mm.

The at least one arm and the cross-member may comprise different materials.

The at least one arm may comprise a first material and the cross-member may comprise a second material and wherein the first material is different from the second material.

The at least one arm may comprise a material that is not weldable. The cross-member may comprise a material that is non-conductive. The process may further comprise arranging a collar within an extremity of the cross-member. The collar may comprise a highly conductive material.

The process may further comprise arranging a collar around an extremity of the cross-member. The collar may comprise a highly conductive material.

The cross-member may comprise a composite material. The arranging may comprise at least one of maintaining a desired clamp angle and maintaining a desired a camber angle.

The invention also provides for an axle made by the process described above.

The invention also provides for a process of assembling an axle comprising arranging an extremity of a cross-member within an opening of at least one arm, and fastening together in a rigid manner the extremity and the at least one arm using magneto-forming, wherein at least one of the cross-member and the at least one arm comprising at least one metallic material.

The invention also provides for an axle made by the process described above.

The invention also provides for a process of assembling an axle comprising arranging a projecting portion of at least one arm at least partially with an extremity of a cross-member and fastening together in a rigid manner the extremity and the projecting portion using magneto-forming, wherein at least one of the cross-member and the at least one arm comprising at least one metallic material.

The invention also provides for an axle made by the process described above.

BRIEF DESCRIPTION OF THE DRAWINGS

Other characteristics and advantages of the invention will become apparent from an examination of the detailed description below and from the attached drawings, wherein:

FIGS. 3A and 3B show, very schematically, longitudinal and transverse sectional views, respectively, of the extremity 5 of the cross-member preform 1 (FIG. 2) in its socket 4 during the operation of magneto-forming according to a first embodiment mode of the invention;

FIG. 4 shows, very schematically, a longitudinal sectional view of the extremity 4 of the cross-member preform 1 in a second embodiment mode of the invention;

FIG. 5 shows a detail of an exploded view of an arm 2 and of a cross-member preform 1 according to this second embodiment mode of the present invention;

FIGS. 6A and 6B show, schematically, operations for fastening of cross-members made of composite material comprising, respectively, an internal conductive collar and an external conductive collar; and FIG. 7 shows a variant of the embodiment represented in FIG. 3B; according to this Figure, one of the elements (in the example represented, the socket 4) has a form devoid of rotational symmetry.

DETAILED DESCRIPTION OF THE PREFERRED EMBODIMENTS

The drawings essentially contain elements of definite character. They may therefore not only serve to make the description better understood but may also contribute to the definition of the invention, if need be.

Figure 1:
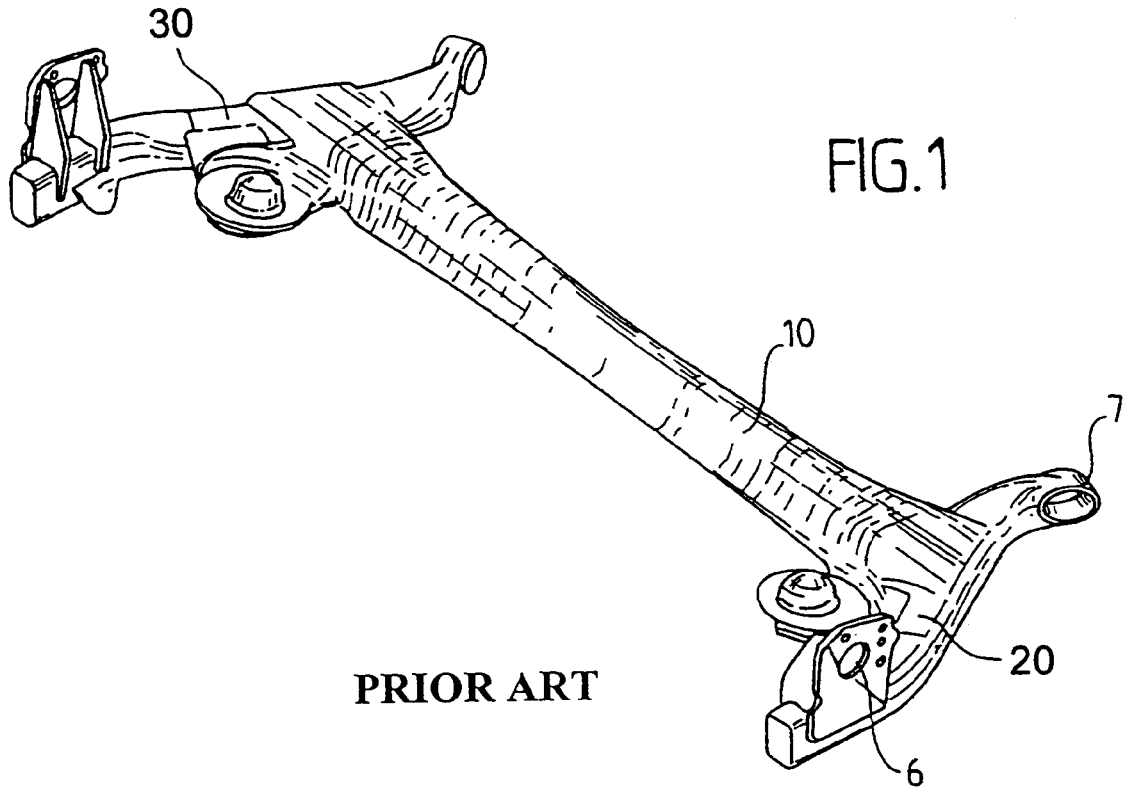
FIG. 1 shows a standard semi-rigid axle.

First of all, reference will be made to FIG. 1, which represents a semi-rigid axle (also known as a "deformable axle") which is intended to operate at the rear of a motor vehicle and which comprises a cross-member 10 which is assembled to two approximately symmetrical arms 20 and 30. At the extremities of each arm 20, 30 there can be seen, on the one hand, a plate 6 which in principle is intended to receive a wheel-carrying spindle and, on the other hand, a recess 7 which in principle is intended to receive an elastic articulation for connection to the body shell. The cross-member 10 is of non-circular and non-constant cross-section, as can be seen in FIG. 1, so as to be sufficiently rigid in flexion, supple in torsion and capable of withstanding the stresses in operation.

An assembly of one of the arms to an extremity of the cross-member 10 is described below, but the process may be applied equally well to the assembly of the two arms 20 and 30 to the extremities of the cross-member 10.

However, this assembly is generally tricky in conception and fabrication, particularly when the materials being used are not weldable to one another (the cross-member, on the one hand, and the arm, on the other hand) by standard methods of fabrication. Typically, a cross-member 10 may be made of steel, whereas the arms 20, 30 are made of cast iron or of aluminum.

The weld seam generally constitutes a zone of weakness of the axle, in particular for cyclic loads.

When it is desired to weld arms to a cross-member that has been produced from a different material, one known solution consists in using an "insert". The actual arm is cast on an insert made of the same material as the cross-member (steel, in particular), and the cross-member is welded to this insert.

This technique has a disadvantage relating to the number of supplementary steps to be provided for so as to ensure a reliable fastening. Moreover, the welding generally creates deformations and thermal stresses, the result of which may be manifested in a deviation, in relation to a tolerance which has been provided for, of the camber angle, or even of the clamp angle of a wheel that is intended to be mounted on a wheel-carrying spindle connected to the arm.

Another known solution consists in providing for bolting of the arm to the cross-member. A steel plate, which in general is pierced by holes for the passage of screws, is welded perpendicularly to the extremity of the cross-member. Said plate is also machined perpendicularly to the axis of the cross-member after welding. At the same time, internal screw threads and a bearing face are machined in the arm. Finally, the assembly constituted by cross-member and arm is assembled by means of screws.

It will be readily understood that this solution considerably increases the weight of the semi-rigid axle and complicates the structure thereof.

More generally, the known solutions for fastening an arm of a semi-rigid axle to a cross-member are difficult to put into effect, in particular so as to meet the requisite conditions of endurance, which generally imposes a burden on their cost of fabrication.

The axles must, in fact, comply simultaneously with static impositions, which define the on-road behavior of the axle, and with dynamic impositions (endurance of the axle, fatigue tests).

So-called "ESTR" tests are, for example, realised in respect of complete axles which are mounted on a clamped motor-vehicle body shell, the loads being exerted by false wheels in order to simulate diverse on-road behaviors according to a specification which is peculiar to each vehicle.

The applicant has therefore put into effect a process according to the invention that causes a fastening to occur by magneto-forming. Difficulties in implementing this process have arisen nevertheless. However, indisputable advantages have stemmed from said process when these difficulties have been overcome.

In the first place, a difficulty associated with the space occupied by the arm, by virtue of its shape, had to be overcome. It was necessary to provide magneto-forming devices that are sufficiently powerful but of sufficiently reduced size so as to operate in a restricted environment. At the same time, it was necessary to procure elements (overall, tubular and hollow) that have, at the same time, a mechanical suppleness permitting them to be deformed by magneto-forming and to resist everyday stresses when the vehicle equipped with such a semi-rigid axle is in operation.

Several solutions are proposed below permitting such difficulties to be overcome, corresponding to different embodiment modes.

Figure 2:
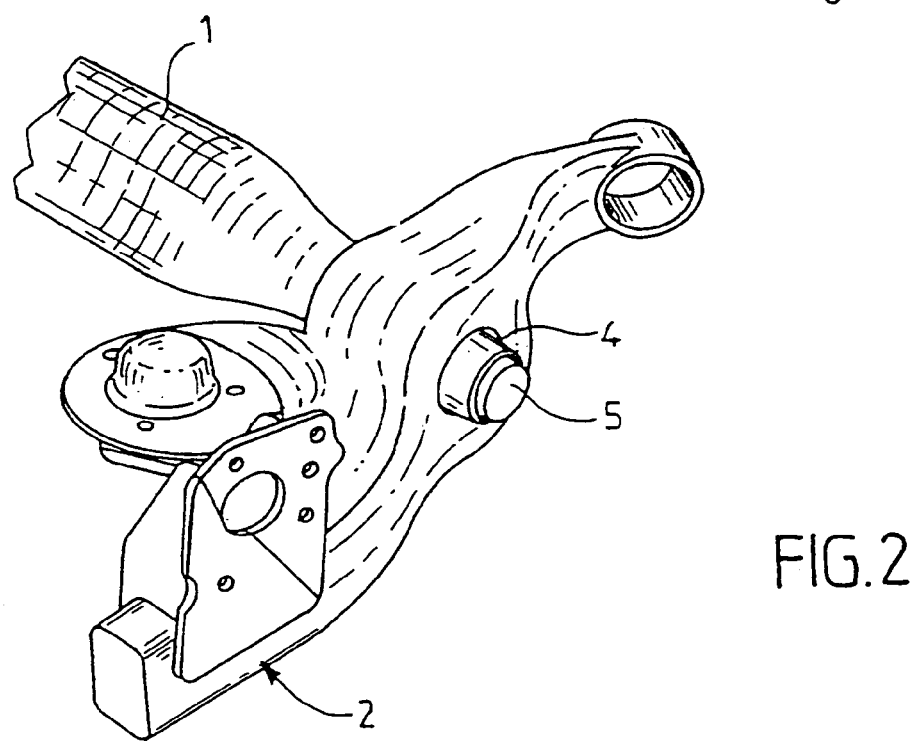
FIG. 2 shows a detailed view of an arm and of a semi-rigid cross-member preform, which are disposed so as to be fastened to one another in accordance with a first embodiment mode of the present invention.

Referring to FIG. 2, the assembly constituted by arm and cross-member preform comprises a protuberance of an extremity 5, the external surface of which corresponds to an internal surface of a socket 4 for the aforementioned protuberance 5.

In the first embodiment represented in FIG. 2, the cross-member preform is extended at its extremity by way of a tubular restricted part. In this first embodiment the extremity constitutes a protuberance which is approximately cylindrical and hollow, as can be seen in FIGS. 3A and 3B. For its part, the arm 2 comprises an opening forming a socket 4 for the extremity 5 of the cross-member preform 1.

Referring to FIGS. 3A and 3B, in order to realize the fastening of the cross-member preform 1 to the arm 2 an electromagnetic element AM (schematized by a few turns) is introduced into the hollow part of the extremity 5 of the cross-member preform 1 in order to create a magnetic field and in this way to generate a force-field F capable of deforming the extremity 5 of the cross-member preform 1 in such a manner that the walls (of chosen thickness W) of the hollow extremity 5 come into interfering contact with the socket 4 which is arranged in the arm 2. As will be noted in FIGS. 3A and 3B, a clearance J (preferably of the order of 0.5 mm) is provided between the walls of the hollow extremity 5 and of the socket 4, permitting the cross-member preform 1 to be positioned precisely in relation to the arm prior to definitive fastening.

As shown by FIGS. 3A and 3B, as well as FIG. 4 (which will be described in detail below), this clearance J results from the difference between the internal radius of the socket 4 and the external radius of the protuberance or extremity 5.

Of course, the thickness W to be provided for the walls of the extremity 5 of the cross-member 1 depends on the clearance J, on the physical and metallurgical characteristics of the material of the extremity 5, on the desired resistance of the extremity to the loads in operation and on the electrical characteristics of the electromagnetic element AM.

In advantageous manner, the chosen thickness W is relatively small (approximately equal to or less than 5 mm, preferably less than or approximately equal to 3 mm), so that the easier deformation requires little energy to develop by magneto-forming and tolerates a material that is moderately electrically conductive, such as steel. A thickness that is too small does not permit the static or cyclic loads in operation to be resisted.

The extremity 5 of the cross-member preform 1 may be cylindrical, and may be generated by rotation or not generated by rotation. The socket 4 that is provided in the arm 2 may be arranged so as to receive this extremity 5 of the cross-member preform 1, with or without machining. The clearance J is provided between the respective surfaces of the extremity 5 of the cross-member preform 1 and of its socket 4.

The socket 4 that is provided may be of cylindrical form, and may be generated by rotation or not generated by rotation. FIG. 7 shows, furthermore, an embodiment in which the socket 4 possesses a cylindrical form which is fluted longitudinally by virtue of two flutes 9. The extremity 5 of the cross-member preform 1, on the other hand, is cylindrical, generated by rotation. During the operation of magneto-forming, the extremity 5 which is swollen by the deformation is advantageously impressed into the flutes 9 of the socket 4. This results in a locking of the resultant assembly in rotation. Annular flutes (not represented) may also be provided on the socket 4, in order to lock the assembly in translation. Other forms not generated by rotation may be provided, for example polygonal, elliptical, multi-lobe, circular notched or grooved forms.

Step c) of the process according to the invention utilizes a technique for deforming metallic parts with high energy (magneto-forming). The application of an intense magnetic-field impulse in a first tubular part permits circular eddy currents ° F. to be created on the surface of the part, the interaction of which with the magnetic field permits the material (steel, aluminum, cast iron, etc.) of the first tubular part (extremity 5 of the cross-member preform 1 in the first embodiment mode described above) to be violently repelled so far as to cause it to conform in shape to a second part (the socket 4 which is constituted in the arm 2), to which it is desired to establish a strong connection, of cold-weld type.

In this way, the electromagnetic element AM, which is schematized by a few turns is supplied electrically (signs + and −) in very coarse fashion with the aid of a source which is provided to this end (generally a battery of capacitors). The variation in the magnetic field B (FIG. 3A) creates the magneto-forming force which distends the extremity 5 of the cross-member preform 1, which then becomes crimped in the socket 4 of the arm 2. The deformation takes effect at very great speed without resilience. Here, the respective surfaces of the extremity 5 of the cross-member 1 and of its socket 4 are interpenetrated at the level of the superficial atomic layers after the stage of fastening by magneto-forming: one then speaks, in contrast, of "cold welding" between the cross-member 1 and the arm 2.

The aforementioned socket 4 is preferably machined so as to define a precise surface of contact, permitting the cross-member 1 to be oriented precisely in relation to the arms 2 or 3. On the other hand, it is advantageously not helpful to have great precision on the surface of the extremity of the cross-member preform 1. In fact, in the other techniques of assembly (welding, bolting, etc.) these docking zones generally have to be defined in very precise manner.

The fastening by magneto-forming in the process according to the invention offers, in particular, the advantage of dispensing with operations in the processes of the prior art, said operations consisting in adapting precisely the shape of the extremities of the cross-member preform 1 prior to assembly to the arms 2,3.

Moreover, on a complete axle this process permits all the defects accumulated in each component to be compensated, and thus permits a final step of the known processes to be dispensed with, which consists in correcting the geometry of the chassis of the vehicle so as to take up the prescribed tolerances.

A magneto-forming device that is suitable for such deformations is described, for example, in the article by J. P. Collaudin et G. Faller in the periodical *Métaux Déformation* No. 68 (September-October 1981). For this reason, the content of this article is to be considered as forming an integral part of the description for all useful purposes.

In a second. embodiment, which is represented in FIGS. 4 and 5, the arm comprises a teat 105 which comes to be located in a tubular extremity 104 of the cross-member preform 100 forming a socket. A magnetic field generates forces which apply the extremity 104 of the cross-member preform 100 against the teat 105 which the arm 102 includes. In this second embodiment the electromagnetic element AM' is an element surrounding the exterior of the extremity 104 of the cross-member preform 100 (an encircling coil which is schematized here by a number of turns).

Thus the process according to the invention utilizes a step of magneto-forming which permits parts produced from non-weldable materials to be fastened to one another in standard "hot" manner without making the axle heavier. This process is therefore much simpler to implement than the other customary processes.

Another possible application is particularly advantageous for a cross-member 5' made of composite material with an annular collar 8 made of copper or aluminum, which are highly conductive materials, on the interior surface or on the exterior surface of the extremity of the cross-member preform 5', as FIGS. 6A and 6B show, respectively.

Of course, the present invention is not limited to the embodiment described above by way of example; said invention extends to other variants.

Thus it will be understood that the device, use of which is foreseen above, with an internal coil or an external coil, is described by way of example. Other. devices (which foresee, for example, the use of two coils at once, internal and external) may be used, as long as they comply with the conditions of space occupied by the axles in the course of fabrication, and as long as they ensure the magnetic forces required for the deformation of the materials.

The process according to the invention is applicable in particularly advantageous manner to the fastening of arms (in particular, those made of cast iron) to cross-members of tubular form.

The application is all the more advantageous when the deformed part is made of highly electrically conductive metal.

The invention claimed is:

1. A process for fabricating an axle that includes a cross-member and arms which are assembled to extremities of the cross-member, said process comprising:
    forming a cross-member with an extremity and at least one arm having a socket;
    arranging, in a fastening position, the extremity of the cross-member within the socket of the at least one arm;
    adjusting a relative position of the cross-member and the at least one arm prior to fastening the extremity to the socket; and
    fastening together in a rigid manner, at an adjusted position, the extremity of the cross-member and the socket of the at least one arm using a magneto-forming process;
    wherein the fastening occurs while the cross-member and the at least one arm are in the fastening position and results in interfering contact between an outer surface of the extremity and an inner surface of the socket,
    wherein at least one of the cross-member and the at least one arm comprise at least one metallic material,
    wherein the extremity comprises a protuberance, and
    wherein the fastening comprises subjecting the protuberance of the cross-member to radial deformation using the magneto-forming process.

2. The process of claim 1, wherein the axle comprises a semi-rigid axle.

3. The process of claim 1, wherein the arranging comprises inserting the extremity of the cross-member within the socket of the at least one arm such that an interference fit is provided between the extremity and the socket.

4. The process of claim 1, wherein the extremity of the cross-member comprises a hollow space adapted to receive an electromagnetic element that is capable of generating a magnetic field.

5. The process of claim 4, wherein the hollow space is defined by a cylindrical wall.

6. The process of claim 1, wherein the socket comprises a homologous socket.

7. The process of claim 1, wherein the arranging comprises inserting the extremity of the cross-member within the socket of the at least one arm such that a clearance is provided between the extremity and the socket, whereby the clearance allows for relative positioning of the extremity and the socket.

8. The process of claim 7, wherein the clearance is close to 0.5 mm.

9. The process of claim 1, further comprising shaping an extremity of the cross-member prior to the arranging and the fastening.

10. The process of claim 1, further comprising arranging a collar within the extremity of the cross-member.

11. The process of claim 10, wherein the collar comprises a highly conductive material.

12. An axle made by the process of claim 1.

13. The process of claim 1, wherein the extremity is non-cylindrical and the socket is non-cylindrical.

14. The process of claim 1, wherein the socket comprises annular flutes.

* * * * *